US010187377B2

(12) United States Patent
Golshan et al.

(10) Patent No.: US 10,187,377 B2
(45) Date of Patent: Jan. 22, 2019

(54) CACHING NETWORK GENERATED SECURITY CERTIFICATES

(71) Applicant: A10 Networks, Inc., San Jose, CA (US)

(72) Inventors: Ali Golshan, Palo Alto, CA (US); Xuyang Jiang, Saratoga, CA (US); Yang Yang, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 141 days.

(21) Appl. No.: 15/428,036

(22) Filed: Feb. 8, 2017

(65) Prior Publication Data

US 2018/0227292 A1 Aug. 9, 2018

(51) Int. Cl.
H04L 29/06 (2006.01)
(52) U.S. Cl.
CPC ...... H04L 63/0823 (2013.01); *H04L 63/0281* (2013.01)
(58) Field of Classification Search
CPC ............. H04L 63/0281; H04L 63/0442; H04L 63/0464; H04L 63/0823; H04L 63/0853; H04L 63/166; H04L 9/3263
See application file for complete search history.

(56) References Cited

U.S. PATENT DOCUMENTS

| 4,001,819 | A | 1/1977 | Wise |
| 5,101,402 | A | 3/1992 | Chiu et al. |
| 5,163,088 | A | 11/1992 | LoCascio |
| 5,359,659 | A | 10/1994 | Rosenthal |
| 5,414,833 | A | 5/1995 | Hershey et al. |
| 5,684,875 | A | 11/1997 | Ellenberger |

(Continued)

FOREIGN PATENT DOCUMENTS

| CN | 1422468 A | 6/2003 |
| TW | 375721 | 12/1999 |

(Continued)

OTHER PUBLICATIONS

Jarmoc, SSL Interception Proxies and Transitive Trust, 2012.*

(Continued)

*Primary Examiner* — Minh Dinh
(74) *Attorney, Agent, or Firm* — Keith Kline; The Kline Law Firm PC

(57) ABSTRACT

Provided are methods and systems for caching network generated security certificates. An example system may include a security gateway node and a storage module. The security gateway node may be operable to receive, from a client, a session request to establish a secure connection with a server. Based on the session request, the security gateway node may establish a first secure session between the client and the security gateway node and a second secure session between the security gateway node and the server. The security gateway node may receive a server certificate from the server. The security gateway node may match the server certificate against a gateway certificate table. Based on the matching, the security gateway node may receive a gateway certificate associated with the gateway certificate entry that matches the server certificate. The gateway certificate may be used for performing the first secure session.

18 Claims, 11 Drawing Sheets

(56) References Cited

U.S. PATENT DOCUMENTS

| | | | |
|---|---|---|---|
| 5,940,002 A | 8/1999 | Finn et al. | |
| 5,960,177 A | 9/1999 | Tanno | |
| 6,088,804 A | 7/2000 | Hill et al. | |
| 6,119,236 A | 9/2000 | Shipley | |
| 6,205,115 B1 | 3/2001 | Ikebe et al. | |
| 6,237,036 B1 | 5/2001 | Ueno et al. | |
| 6,304,975 B1 | 10/2001 | Shipley | |
| 6,324,286 B1 | 11/2001 | Lai et al. | |
| 6,449,651 B1 | 9/2002 | Dorfman et al. | |
| 6,519,703 B1 | 2/2003 | Joyce | |
| 6,594,780 B1 | 7/2003 | Shen et al. | |
| 6,715,081 B1 | 3/2004 | Attwood et al. | |
| 6,732,279 B2 | 5/2004 | Hoffman | |
| 6,735,702 B1 | 5/2004 | Yavatkar et al. | |
| 6,754,832 B1 | 6/2004 | Godwin et al. | |
| 6,757,822 B1 | 6/2004 | Feiertag et al. | |
| 6,779,117 B1 | 8/2004 | Wells | |
| 6,988,106 B2 | 1/2006 | Enderwick et al. | |
| 7,159,237 B2 | 1/2007 | Schneier et al. | |
| 7,194,766 B2 | 3/2007 | Noehring et al. | |
| 7,222,366 B2 | 5/2007 | Bruton, III et al. | |
| 7,296,283 B2 | 11/2007 | Hrastar et al. | |
| 7,392,241 B2 | 6/2008 | Lin et al. | |
| 7,418,733 B2 | 8/2008 | Connary et al. | |
| 7,543,052 B1 | 6/2009 | Cesa Klein | |
| 7,565,549 B2 | 7/2009 | Satterlee et al. | |
| 7,577,833 B2 | 8/2009 | Lai | |
| 7,640,591 B1 | 12/2009 | Tripathi et al. | |
| 7,653,633 B2 | 1/2010 | Villella et al. | |
| 7,665,138 B2 | 2/2010 | Song et al. | |
| 7,739,736 B1 | 6/2010 | Tripathi et al. | |
| 7,809,131 B1 | 10/2010 | Njemanze et al. | |
| 7,895,649 B1 | 2/2011 | Brook et al. | |
| 8,037,532 B2 | 10/2011 | Haswell | |
| 8,220,056 B2 | 7/2012 | Owens, Jr. | |
| 8,239,670 B1 | 8/2012 | Kaufman et al. | |
| 8,289,981 B1 | 10/2012 | Wei et al. | |
| 8,301,802 B2 | 10/2012 | Wei et al. | |
| 8,438,628 B2* | 5/2013 | Shah | H04L 63/0428 380/255 |
| 8,448,245 B2 | 5/2013 | Banerjee et al. | |
| 8,478,708 B1 | 7/2013 | Larcom | |
| 8,539,226 B2* | 9/2013 | Little | G06Q 10/107 709/217 |
| 8,595,845 B2 | 11/2013 | Basavapatna et al. | |
| 8,800,034 B2 | 8/2014 | McHugh et al. | |
| 8,806,011 B1 | 8/2014 | Graham-Cumming | |
| 8,813,228 B2 | 8/2014 | Magee et al. | |
| 8,832,832 B1 | 9/2014 | Visbal | |
| 9,215,208 B2 | 12/2015 | Fraize et al. | |
| 9,621,575 B1 | 4/2017 | Jalan et al. | |
| 2001/0042204 A1 | 11/2001 | Blaker et al. | |
| 2002/0087708 A1 | 7/2002 | Low et al. | |
| 2002/0188839 A1 | 12/2002 | Noehring et al. | |
| 2003/0023846 A1 | 1/2003 | Krishna et al. | |
| 2003/0028585 A1 | 2/2003 | Yeager et al. | |
| 2003/0061507 A1 | 3/2003 | Xiong et al. | |
| 2003/0069973 A1 | 4/2003 | Ganesan et al. | |
| 2003/0135625 A1 | 7/2003 | Fontes et al. | |
| 2003/0187688 A1 | 10/2003 | Fey et al. | |
| 2003/0196081 A1 | 10/2003 | Savarda et al. | |
| 2003/0200456 A1 | 10/2003 | Cyr et al. | |
| 2004/0008711 A1 | 1/2004 | Lahti et al. | |
| 2004/0054807 A1 | 3/2004 | Harvey et al. | |
| 2004/0059943 A1 | 3/2004 | Marquet et al. | |
| 2004/0059951 A1 | 3/2004 | Pinkas et al. | |
| 2004/0059952 A1 | 3/2004 | Newport et al. | |
| 2004/0093524 A1 | 5/2004 | Sakai | |
| 2004/0111635 A1 | 6/2004 | Boivie et al. | |
| 2004/0143751 A1 | 7/2004 | Peikari | |
| 2004/0242200 A1 | 12/2004 | Maeoka et al. | |
| 2005/0021999 A1 | 1/2005 | Touitou et al. | |
| 2005/0036501 A1 | 2/2005 | Chung et al. | |
| 2005/0041584 A1 | 2/2005 | Lau et al. | |
| 2005/0044068 A1 | 2/2005 | Lin et al. | |
| 2005/0044270 A1 | 2/2005 | Grove et al. | |
| 2005/0069136 A1* | 3/2005 | Thornton | H04L 63/0823 380/277 |
| 2005/0108434 A1 | 5/2005 | Witchey | |
| 2005/0210243 A1 | 9/2005 | Archard et al. | |
| 2005/0257093 A1 | 11/2005 | Johnson et al. | |
| 2006/0056297 A1 | 3/2006 | Bryson et al. | |
| 2006/0061507 A1 | 3/2006 | Mohamadi | |
| 2006/0143707 A1 | 6/2006 | Song et al. | |
| 2006/0206936 A1 | 9/2006 | Liang et al. | |
| 2006/0212522 A1 | 9/2006 | Walter et al. | |
| 2006/0251057 A1 | 11/2006 | Kwon et al. | |
| 2006/0253902 A1 | 11/2006 | Rabadan et al. | |
| 2006/0256716 A1 | 11/2006 | Caci | |
| 2006/0265585 A1 | 11/2006 | Lai | |
| 2006/0288411 A1 | 12/2006 | Garg et al. | |
| 2007/0056038 A1 | 3/2007 | Lok | |
| 2007/0073660 A1 | 3/2007 | Quinlan | |
| 2007/0291773 A1 | 12/2007 | Khan et al. | |
| 2008/0183885 A1 | 7/2008 | Durrey et al. | |
| 2008/0229418 A1 | 9/2008 | Chen et al. | |
| 2008/0256623 A1 | 10/2008 | Worley et al. | |
| 2009/0049198 A1 | 2/2009 | Blinn et al. | |
| 2009/0070470 A1 | 3/2009 | Bauman et al. | |
| 2009/0150996 A1 | 6/2009 | Haswell | |
| 2009/0168995 A1 | 7/2009 | Banga et al. | |
| 2009/0227228 A1 | 9/2009 | Hu et al. | |
| 2009/0241190 A1 | 9/2009 | Todd et al. | |
| 2009/0287941 A1 | 11/2009 | Shouno | |
| 2010/0106833 A1 | 4/2010 | Banerjee et al. | |
| 2010/0284300 A1 | 11/2010 | Deshpande et al. | |
| 2010/0286998 A1 | 11/2010 | Picken | |
| 2011/0026537 A1 | 2/2011 | Kolhi et al. | |
| 2011/0029599 A1 | 2/2011 | Pulleyn et al. | |
| 2011/0082947 A1 | 4/2011 | Szeto et al. | |
| 2011/0093785 A1 | 4/2011 | Lee et al. | |
| 2011/0131646 A1 | 6/2011 | Park et al. | |
| 2011/0153744 A1 | 6/2011 | Brown | |
| 2011/0249572 A1 | 10/2011 | Singhal et al. | |
| 2012/0036272 A1 | 2/2012 | El Zur | |
| 2012/0042060 A1 | 2/2012 | Jackowski et al. | |
| 2012/0110472 A1 | 5/2012 | Amrhein et al. | |
| 2012/0117646 A1 | 5/2012 | Yoon et al. | |
| 2012/0163186 A1 | 6/2012 | Wei et al. | |
| 2012/0174196 A1 | 7/2012 | Bhogavilli et al. | |
| 2012/0226582 A1 | 9/2012 | Hammad | |
| 2012/0307631 A1 | 12/2012 | Yang et al. | |
| 2013/0019025 A1 | 1/2013 | Chaturvedi et al. | |
| 2013/0124713 A1 | 5/2013 | Feinberg et al. | |
| 2013/0128885 A1 | 5/2013 | Kardashov et al. | |
| 2013/0139245 A1 | 5/2013 | Thomas | |
| 2013/0173795 A1 | 7/2013 | McPherson | |
| 2013/0198385 A1 | 8/2013 | Han et al. | |
| 2013/0212265 A1 | 8/2013 | Rubio Vidales et al. | |
| 2014/0006508 A1 | 1/2014 | Goyet et al. | |
| 2014/0025568 A1 | 1/2014 | Smith et al. | |
| 2014/0095865 A1* | 4/2014 | Yerra | H04L 9/3265 713/156 |
| 2014/0137190 A1 | 5/2014 | Carey et al. | |
| 2014/0143852 A1* | 5/2014 | Cottrell | H04L 63/0281 726/12 |
| 2014/0258489 A1 | 9/2014 | Muppala et al. | |
| 2014/0258536 A1 | 9/2014 | Chiong | |
| 2014/0269308 A1 | 9/2014 | Oshiba | |
| 2014/0280832 A1 | 9/2014 | Oshiba | |
| 2014/0283065 A1 | 9/2014 | Teddy et al. | |
| 2014/0298091 A1 | 10/2014 | Carlen et al. | |
| 2014/0310396 A1 | 10/2014 | Christodorescu et al. | |
| 2014/0325588 A1 | 10/2014 | Jalan et al. | |
| 2015/0033341 A1 | 1/2015 | Schmidtler et al. | |
| 2015/0088597 A1 | 3/2015 | Doherty et al. | |
| 2015/0312268 A1 | 10/2015 | Ray | |
| 2015/0333988 A1 | 11/2015 | Jalan et al. | |

(56) References Cited

U.S. PATENT DOCUMENTS

| | | |
|---|---|---|
| 2017/0085440 A1 | 3/2017 | Dosovitsky |
| 2017/0163736 A1* | 6/2017 | Jiang .................... H04L 67/141 |

FOREIGN PATENT DOCUMENTS

| | | |
|---|---|---|
| TW | 477140 B | 2/2002 |
| TW | 574655 B | 2/2004 |
| TW | 576066 B | 2/2004 |
| TW | I225999 B | 1/2005 |
| TW | I252976 B | 4/2006 |
| WO | WO1998042108 A1 | 9/1998 |
| WO | WO2013112492 A1 | 8/2013 |
| WO | WO2014150617 A1 | 9/2014 |
| WO | WO2014151072 A1 | 9/2014 |
| WO | WO2014176461 A1 | 10/2014 |

OTHER PUBLICATIONS

Jarmoc, Transitive Trust: SSL/TLS Interception Proxies, 2012.*

"Oracle Intelligent Agent User's Guide," Oracle Corporation, Release 9.2.0, Part No. A96676-01, Mar. 2002, 36 pages.

"SOL 11243: iRules containing the RULE_INIT iRule event do not re-initialize when a syntax error is corrected," F5 Networks, Inc., f5.support.com, May 24, 2010, 1 page.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerlS," IEEE, pp. 279-288, Dec. 12-14, 2002.

Dainotti, Albert et al., "TIE: A Community-Oriented Traffic Classification Platform," May 11, 2009, Springer-Verlag, Traffic Monitoring and Analysis: Proceedings First International Workshop, TMA 2009, pp. 64-74, Retrieved from: Inspec. Accession No. 11061142.

Dainotti, Albert et al., "Early Classification of Network Traffic through Multi-Classification," Apr. 27, 2011, Springer Verlag, Traffic Monitoring and Analysis, Proceedings of the Third International Workshop, TMA 2011. pp. 122-135. Retrieved from INSPEC. Accession No. 12232145.

Guo, Yuan-ni et al., "An Embedded Firewall System Design Based on Ptolemy II," Journal of System Simulation, vol. 16 No. 6, pp. 1361-1363, Jun. 2004.

Huang, Quan et al., "An Embedded Firewall Based on Network Processor," IEEE, 2nd International Conference on Embedded Software and Systems, 7 pages, Dec. 16-18, 2005.

Ihde, Michael et al., "Barbarians in the Gate: An Experimental Validation of NIC-Based Distributed Firewall Performance and Flood Tolerance," IEEE, International Conference on Dependable Systems and Networks, Jun. 25-28, 2006, 6 pages.

Susilo, W. et al., "Personal Firewall for Pocket PC 2003: Design & Implementation," IEEE 19th International Conference on Advanced Information Networking and Applications, vol. 2 pp. 661-666, Mar. 28-30, 2005.

* cited by examiner

CACHING NETWORK GENERATED SECURITY CERTIFICATES

TECHNICAL FIELD

This invention relates generally to data networks and more particularly to a security gateway for caching a plurality of network generated security certificates.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Many service providers and corporates have policies to govern the use of computers and digital computing devices over their data networks, particularly policies created for security and fraud usage reasons. It is not uncommon that these business entities inspect data communication sessions used by a client device or a server device in their data network. The service providers and business entities often deploy security gateways such as Secure Socket Layer (SSL) proxy gateways, SSL interception proxy gateways, firewalls or other security proxy appliances to inspect communication sessions even when the sessions are encrypted. These security gateways, when applied to encrypted or secure communication session, intercept security certificates issued by servers and web servers, generate or forge temporary security certificates, and send the forged certificates to client devices. The security gateways then proceed to receive secure content from the client devices, decrypt and inspect the secure content using the forged security certificates, while on the other communication direction, receive secure content from the server device, decrypt and inspect the secure content using the intercepted server security certificates. Upon inspection, the security gateways can enforce applicable security policies set by the service providers or business entities (e.g., corporations).

However, generating or forging temporary security certificates is a computationally intensive process requiring high performance computation capability. The security session interception process works well when the number of intercepted secure sessions is reasonably small but the performance may decrease considerably for a large number of actively inspected secure sessions.

While service providers and business entities are concerned over security and fraud issues, consumers, users, and software vendors are becoming more aware of fraud and identity theft activities leveraging on unsecure content sent or received by users' computing devices. The users' computing device can be instructed to use secure session with strong encryption in communications with servers.

The sudden increase of secure sessions impacts the performance of these security gateways deployed in the data networks, which in turn can affect the user experience associated with services offered by the data networks and the servers, as well as performance of enterprise applications.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The disclosure relates to systems and methods for caching network generated security certificates. According to one embodiment of the disclosure, a system for caching network generated security certificates is provided. The system may include a security gateway node and a storage module communicatively coupled to the security gateway node. The security gateway node may be operable to receive, from a client, a session request to establish a secure connection with a server. Based on the session request, the security gateway node may be further operable to establish a first secure session and a second secure session. The first secure session may include a secure session between the client and the security gateway node and the second secure session may include a secure session between the security gateway node and the server. Upon establishing the second secure session, the security gateway node may be operable to receive a server certificate from the server. The security gateway node may be further operable to match the server certificate against a gateway certificate table based on one or more predetermined criteria to find a gateway certificate entry matching the server certificate. The gateway certificate table may be operable to cache a plurality of gateway certificates associated with one or more previous secure sessions between the client and the server. Based on the matching, the security gateway node may be further operable to receive a gateway certificate. The gateway certificate may be associated with the gateway certificate entry that matches the server certificate. The gateway certificate is used for performing the first secure session. The storage module may be operable to store at least the gateway certificate table.

In another embodiment of the disclosure, a method for caching network generated security certificates is provided. The method may include receiving, from a client, a session request to establish a secure connection with a server. The method may further include establishing, based on the session request, a first secure session and a second secure session. The first secure session may include a secure session between the client and the security gateway node and the second secure session may include a secure session between the security gateway node and the server. Upon establishing the second secure session, the method may continue with receiving a server certificate from the server. The method may further include matching the server certificate against a gateway certificate table based on one or more predetermined criteria to find a gateway certificate entry matching the server certificate. The gateway certificate table may be operable to cache a plurality of gateway certificates associated with one or more previous secure sessions between the client and the server. Upon the matching, the method may continue with receiving a gateway certificate. The gateway certificate may be associated with the gateway certificate entry matching the server certificate. The gateway certificate may be used for performing of the first secure session.

In further example embodiments of the present disclosure, the method steps are stored on a machine-readable medium comprising instructions, which when implemented by one or more processors perform the recited steps. In yet further example embodiments, hardware systems, or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
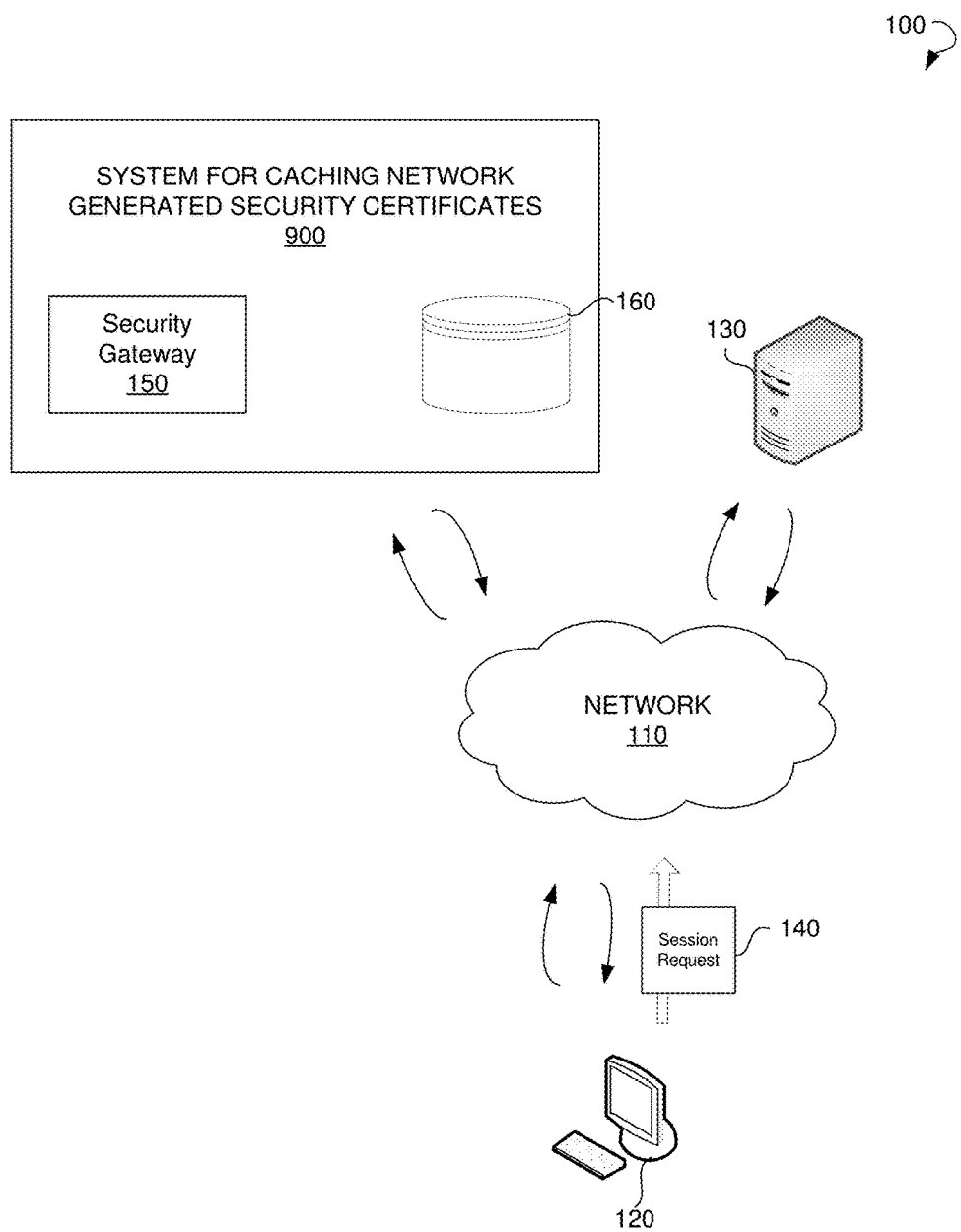
FIG. 1 shows an environment, within which methods and systems for caching network generated security certificates can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to methods and systems for caching network generated security certificates. The methods and systems can allow reducing the need for generating security certificates by caching and reusing previously generated security certificates. According to an example embodiment of the current disclosure, a client may send a session request to a server to establish a secure communication with the server. A security gateway node, also referred herein as a security gateway, may be located in the path between the client and the server and intercept all communications between the client and the server and between the server and the client. For example, the security gateway may be associated with a corporate network of the server and may inspect all incoming and outgoing data packets of the server. Therefore, upon receipt of the session request from the client, the security gateway may establish a secure session with client. The security gateway further establishes another secure session with the server. More specifically, the security gateway may query the server to obtain a server certificate from the server. Upon obtaining of the server certificate, the security gateway may communicate with a storage module coupled to the security gateway to perform a search based on the server certificate. The storage module may store a gateway certificate table, which may comprise gateway certificate entries. The gateway certificate entries may store information associated with a plurality of security certificates previously generated by the security gateway or another network computer and which were used in previous secure sessions between the server and the client.

During the search, the security gateway may match the server certificate against the gateway certificate table. When a match is detected, i.e. when the gateway certificate table contains a gateway certificate entry associated with the server certificate, the security gateway obtains a gateway certificate from the gateway certificate entry. The gateway certificate was generated based on the server certificate during a previous secure session between the server and the client and is cached in the gateway certificate table.

The security gateway may determine whether the gateway certificate obtained from the gateway certificate entry is valid. In some embodiments, such determination may be based on comparing the current time and time information associated with the gateway certificate entry. If the gateway certificate is valid, the security gateway may use the gateway certificate for the secure session established between the client and the security gateway.

When no match between the server certificate and the gateway certificate table is detected, or when the gateway certificate is invalid, the security gateway may generate a new gateway certificate associated with the server certificate. The security gateway may store the generated gateway certificate into a gateway certificate entry of the gateway certificate table. The generated gateway certificate may be used by the security gateway for the secure session established between the client and the security gateway. Furthermore, as the generated gateway certificate is cached (i.e., stored) in the gateway certificate entry, the generated gateway certificate may be re-used by the security gateway for further secure sessions associated with the server and the client.

The gateway certificate table may include a plurality of gateway certificate entries, which may be stored on a flash memory, a hard drive, or any other types of local and external storages. Therefore, when the system for caching network generated security certificates boots, there is no need to re-boot or update all gateway certificates cached in the gateway certificate table.

Referring now to the drawings, FIG. 1 illustrates an environment 100 within which methods and systems for caching network generated security certificates can be implemented. The environment 100 may include a network 110, a client 120, a server 130, and a system 900 for caching network generated security certificates. The client 120 may include a network machine or a network resource that sends a session request 140 for initiating a secure session with the server 130. The client 120 may communicate with the server 130 using the network 110.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network, a virtual private network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

The security gateway node shown as a security gateway 150 may be located in the path between the client 120 and server 130 and may be configured to intercept the session request 140. Upon receiving the session request 140, the system 900 may establish a secure session with the server 130. The security gateway 150 may be communicatively coupled to a storage module 160 that may store cached security certificates associated with previous secure sessions between client 130 and server 130. Generating, updating, caching, and sharing of security certificates is described in detail with reference to FIGS. 2-10.

Figure 2:
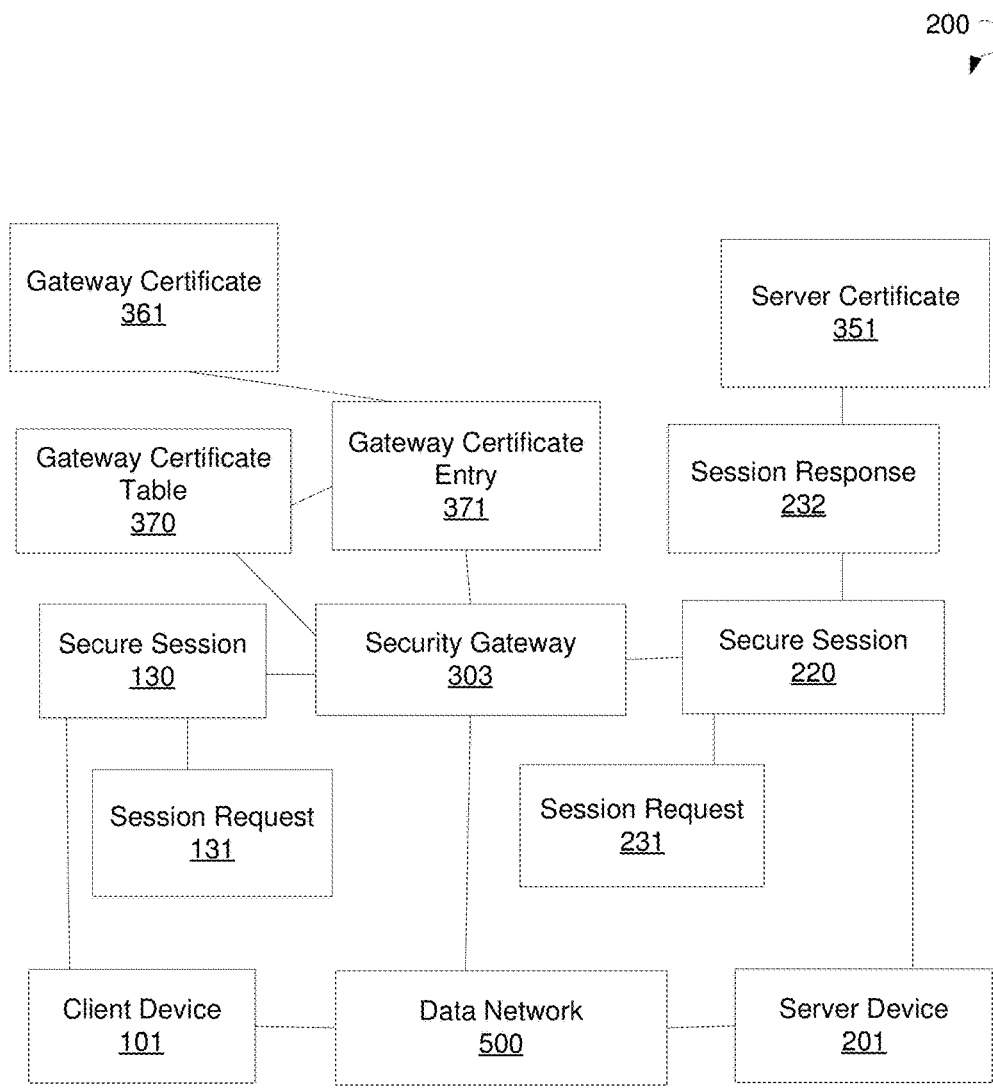
FIG. 2 is a block diagram illustrating a method for intercepting and processing a secure session by a security gateway using a plurality of network generated security certificates.

FIG. 2 illustrates a block diagram 200 for processing of a secure session interception by a security gateway using a plurality of cached network generated security certificates. In an example embodiment, a client shown as a client device 101 may send a session request 131 to establish a secure data session 130 with a server shown as a server device 201 via a security gateway 303. The security gateway 303 can be operable to intercept the session request 131 associated with the secure session 130 and establish another secure session 220 with the service device 201. The security gateway 303 may further receive a secure packet associated with the session request 131 from the client device 101 over the secure session 130. Based on the session request 131, the security gateway 303 may generate a secure packet associated with the session request 231 and send the secure packet associated with the session request 231 to the server device 201 over the secure session 220. Upon processing the received secure packet associated with the session request 231, the server device 201 may respond with a server certificate 351 in a packet associated with a session response 232 and send the packet associated with the session response 232 over the secure session 220 to the security gateway 303. The security gateway 303 may obtain the server certificate 351 from the session response 232 and determine to continue processing the session request 131 based on the server certificate 351.

In an example embodiment, the security gateway 303 may match the server certificate 351 against a gateway certificate table 370 coupled to the security gateway 303. The gateway certificate table 370 can include a plurality of security certificates previously generated by the security gateway 303 or another network computer, which are also referred to herein as network generated security certificates. More specifically, the security gateway 303 may perform a search in the gateway certificate table 370 to find a gateway certificate entry 371 that matches the server certificate 351, as illustrated in detail in FIG. 3.

Figure 3:
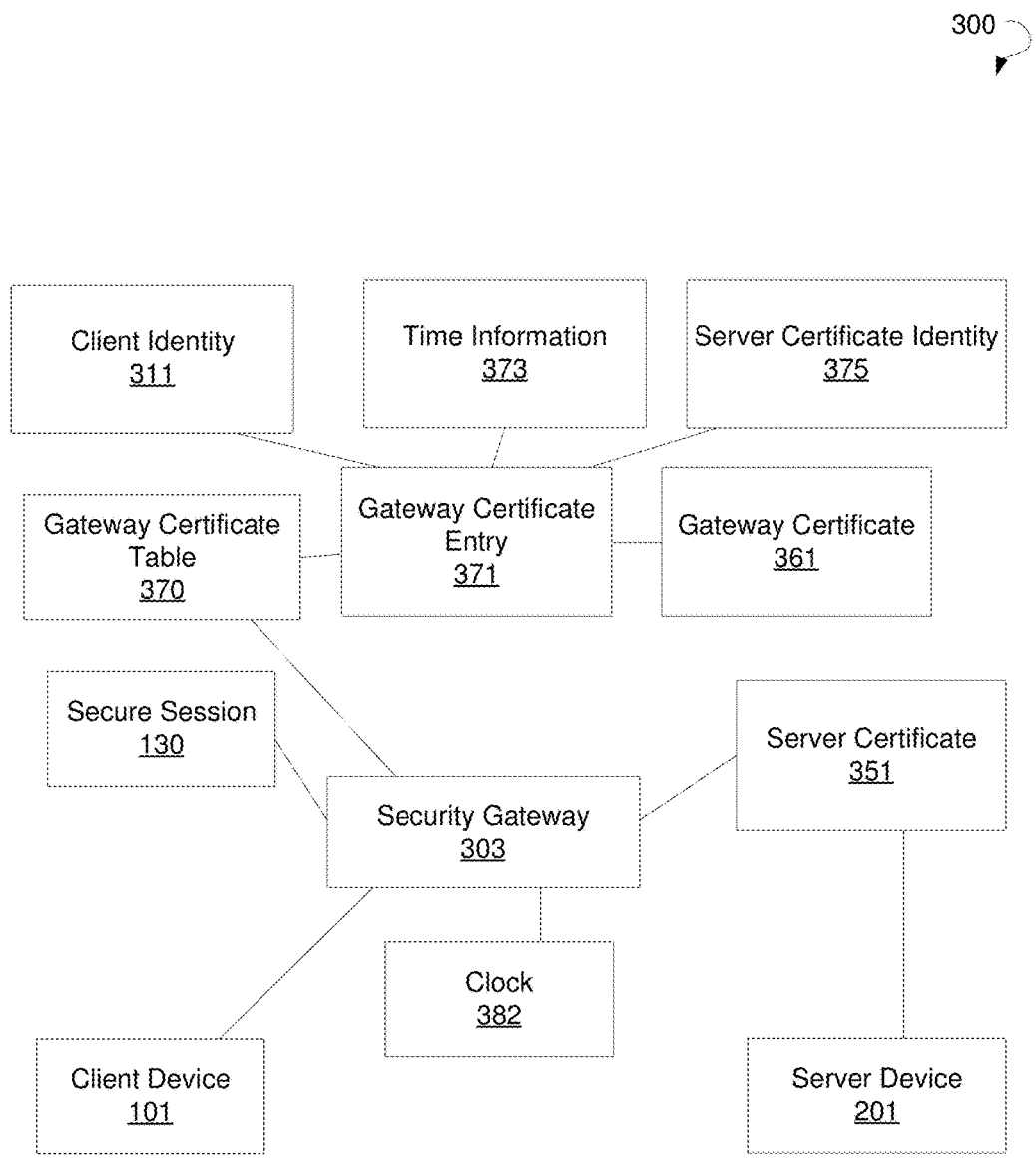
FIG. 3 is a block diagram illustrating a method for processing secure sessions using a plurality of cached network generated security certificates.

FIG. 3 is a block diagram 300 showing processing of secure sessions using a plurality of cached network generated security certificates, according to an example embodiment. To match the server certificate 351, the gateway certificate entry 371 may include a time information 373 indicating the validity time duration of gateway certificate entry 371. In an example embodiment, the security gateway 303 may be coupled to a clock 382 and may use the current time of the clock 382 to validate the time information 373 of gateway certificate entry 371. In an example embodiment, the time information 373 may include an expiration time of the gateway certificate entry 371. For examples, when the expiration time the gateway certificate entry 371 is Aug. 23, 2016 and current time of the clock 382 is Dec. 1, 2015, which is within the expiration time, the security gateway 303 may determine that the time information 373 is valid. In another example embodiment, the time information 373 may include a valid time period. The valid time period may include, for example, 24 hours after Nov. 15, 2014 or between 8 am, Oct. 1, 2015 to 8 pm, Dec. 31, 2015. The current time of the clock 382 may be May 23, 2015. Based on the current time and the valid time period, the security gateway 303 may determine that the time information 373 is not valid. In a further example embodiment, the current time of the clock 382 may be Nov. 26, 2015 and the security gateway 303 may determine that the time information 373 is valid.

In an example embodiment, the security gateway 303 may determine that the gateway certificate entry 371 is invalid when the time information 373 is determined to be invalid. In further example embodiments, the security gateway 303 may check other information, such as a server certificate identity 375 and a client identity 311 included in the gateway certificate entry 371. In an example embodiment, the server certificate identity 375 may include a server certificate identity, such as a server name indication (SNI) or other identity information. The security gateway 303 may match the server certificate identity 375 against an identity of the server certificate 351 to determine if there is a match. In a further example embodiment, the gateway certificate entry 371 may include the client identity 311, which may include one or more of a client network address, Internet Protocol (IP) address, or link layer address. The security gateway 303 may match the client identity 311 against the identity of the client device 101. Additionally, the security gateway 303 may obtain the client identity 311 of the client device 101, namely a client network address, IP address, or link layer address, from the secure session 130, which may include a Transmission Control Protocol (TCP) session, an IP session, and/or a link layer session.

In an example embodiment, the security gateway 303 may determine that the gateway certificate entry 371 matches the server certificate 351 when all predetermined criteria are valid or matched, or when one or more predetermined criteria is valid or matched. In an example embodiment, the security gateway 303 may determine that the gateway certificate entry 371 does not match when one or more predetermined criteria is not valid or does not match. In an example embodiment, the one or more criteria may include a domain name that the client device 101 wants to access, also called as an SNI.

In an example embodiment, the security gateway 303 may determine that the gateway certificate entry 371 matches the server certificate 351. Upon matching, the security gateway 303 may obtain a gateway certificate 361 from gateway certificate entry 371 that matches the server certificate 351. The security gateway 303 may use the gateway certificate 361 for sending to the client device 101 in the secure session 130.

According to another example embodiment, no gateway certificate entries matching the server certificate 351 can be found by the security gateway 303 in the gateway certificate table 370. When the match cannot be found, the security gateway 303 may generate a security certificate shown as a gateway certificate 361. The security gateway 303 may further generate a gateway certificate entry 371 to which the generated gateway certificate 361 may be stored. Additionally, in an example embodiment, the security gateway 303 may store time information 373 into the gateway certificate entry 371. The time information 373 may include, for example, a pre-configured or pre-determined validity time in the security gateway 303, for example 24 hours, 3 days, 30 minutes, 8 am-12 pm Monday-Friday. In an example embodiment, the security gateway 303 may determine the time information 373 from a piece of time information in the server certificate 351. Furthermore, the security gateway 303 may calculate the time information 373 to be half of the time information in the server certificate 351, an earlier time between 24 hours and the validity time of the server certificate 351, or 1 day instead of 36 hours, or other meaningful validity duration for normal security certificate usage. In an example embodiment, the security gateway 303 may not include time information 373 in the gateway certificate entry 371. Additionally, the security gateway 303 may store an identity of the server certificate 351 as a server certificate identity 375 in gateway certificate entry 371. In an example embodiment, the security gateway 303 may obtain a client identity associated with the client device 101, for example from the secure session 130. The security gateway 303 may store the generated gateway certificate entry 371 into the gateway security table 370 so that the generated certificate entry 371 can be re-used for future secure sessions. In an example embodiment, the security gateway 303 may select the generated gateway certificate entry 371 as a matching entry for the server certificate 351.

In a further example embodiment, the security gateway 303 may determine that the matching gateway certificate entry 371 is invalid due to the time information 373. The security gateway 303 may discard gateway certificate entry 371 and generate a new gateway certificate entry as described earlier. Furthermore, the security gateway 303 may replace or modify the gateway certificate entry 371 with the generated new gateway certificate entry. The security gateway 303 may select the generated, replaced, or modified gateway certificate entry 371 as a matching entry for the server certificate 351.

Referring to FIG. 2, in an example embodiment, the security gateway 303 may use the gateway certificate entry 371 to respond to the session request 131 of the secure session 130. Subsequently, the security gateway 303 may apply a gateway function between the secure session 130 and the secure session 220. In an example embodiment of applying the gateway function, the security gateway 303 may receive secure content from the client device 101 over the secure session 130, decrypt the secure content using the gateway certificate 361, examine decrypted secure content based on one or more security policies pre-configured in the security gateway 303, encrypt the decrypted secure content using the server certificate 351 and send the encrypted content to the server device 201 over the secure session 220. Based on the same gateway function, the security gateway 303 may receive secure content from the server device 201 over the secure session 220, decrypt the secure content using the server certificate 351, examine decrypted secure content based on one or more security policies pre-configured in the security gateway 303, encrypt the decrypted secure content using the gateway certificate 361, and send the encrypted content to the client device 101 over the secure session 130.

As shown on FIG. 2, the client device 101, the security gateway 303, and the server device 201 may communicate over a data network 500. In an example embodiment, the data network 500 may include an Ethernet network, an Asynchronous Transfer Mode network, a cellular network, a wireless network, a Frame Relay network, an optical network, an IP network, or any data communication network utilizing other physical layer, link layer capability or network layer to carry data packets. In a further example embodiment, the data network 500 may include a corporate network, a data center network, the Internet, a service provider network, a mobile operator network, or a network 110 shown on FIG. 1.

Figure 4:
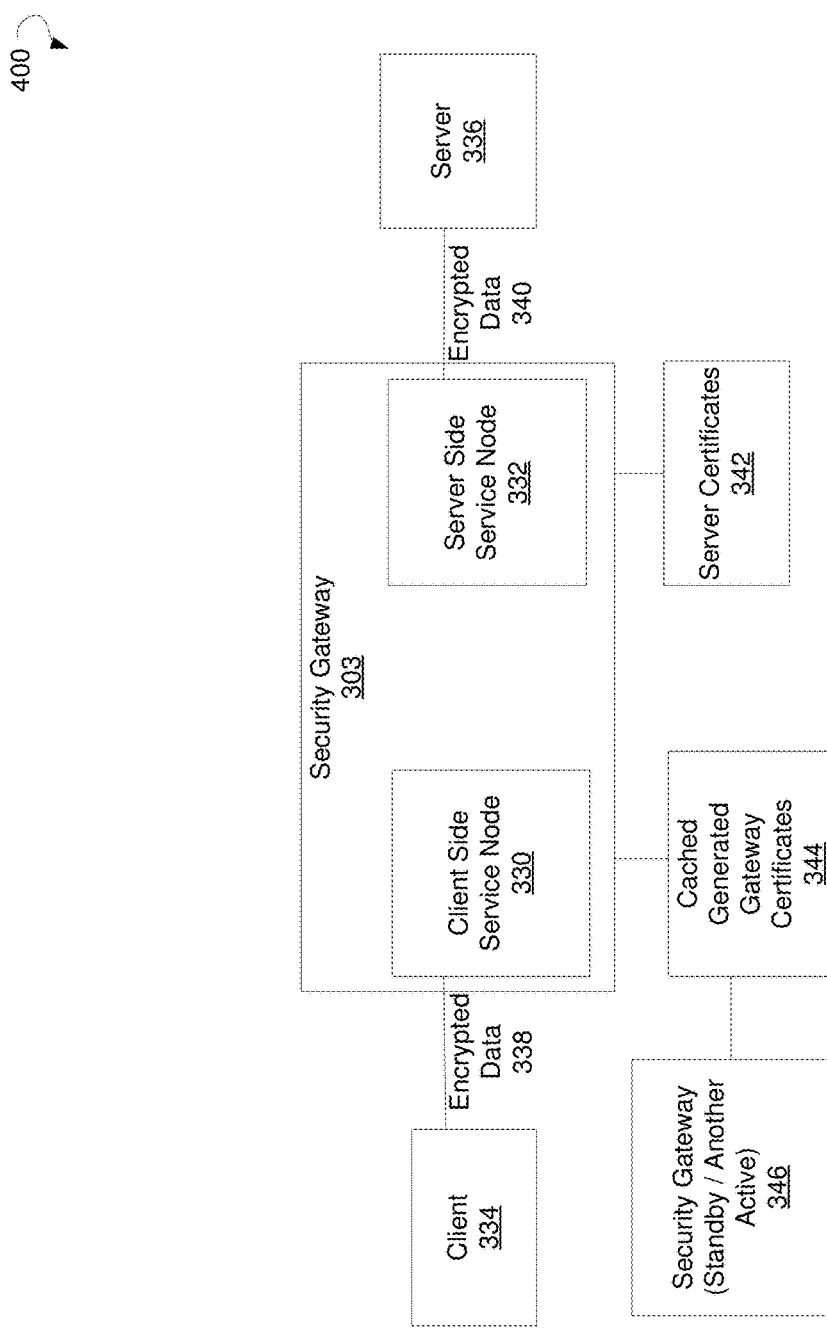
FIG. 4 is a block diagram illustrating interaction of a security gateway with a client and a server using cached network generated security certificates.

FIG. 4 is a block diagram 400 showing interaction of a security gateway with a client and a server using cached network generated security certificates. More specifically, a security gateway 303 may comprise two nodes: a client side service node 330 and a server side service node 332. The client side service node 330 may receive encrypted data 338 directed from a client 334 (for example, via a TCP proxy) to a server 336. In example embodiments, the client 334 may include a host. The server side service node 332 may receive encrypted data 340 directed from the server 336 to the client 334. Furthermore, the client side service node 330 may send the encrypted data 338 received from the client 334 to the server side service node 332. Similarly, the server side service node 332 may send the encrypted data 340 received from the server 336 to the client side service node 330. Therefore, the client 334 and the server 336 may communicate without contacting each other directly.

The security gateway 303 may receive server certificates 342 and generate, based on the server certificates 342, gateway certificates. The generated gateway certificates may be cached so that the security gateway 303 may have access to cached generated gateway certificates 344 during further secure sessions between the client 334 and the server 336.

Additionally, the cached generated gateway certificates 344 may be shared with a security gateway 346. The security gateway 346 may include a security gateway working in a standby mode or another active security gateway. In other words, to make sure that the cached generated gateway certificates 344 remain persistent across boots of the security gateway 303, the cached generated gateway certificates 344 may be shared with the security gateway working in the standby mode or with another active security gateway.

Figure 5:
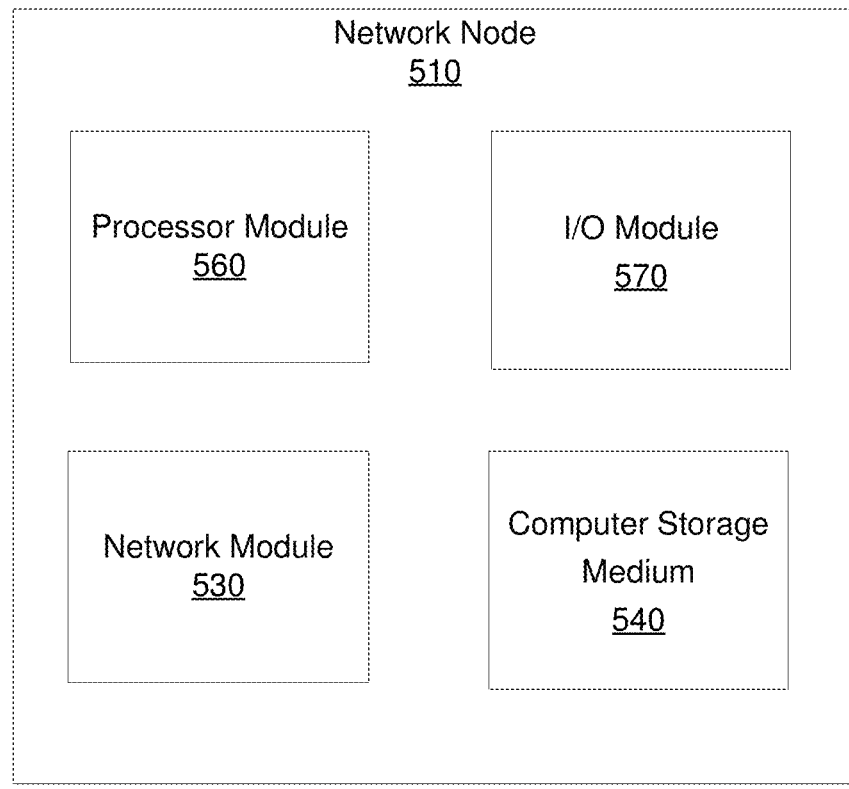
FIG. 5 is a block diagram showing components of a network node.

FIG. 5 is a block diagram illustrating a network node, according to an example embodiment. A network node 510 may include a network computer and may be a security gateway, a client device, or a server device. In an example embodiment, the network node 510 may include a processor module 560, a network module 530, and a computer storage module 540. In an example embodiment, the processor module 560 may include one or more processors which may be a micro-processor, an Intel processor, an Advanced Micro Devices processor, a Microprocessor without Interlocked Pipeline Stages processor, an ARM (advanced RISC machine)-based processor, or a Reduced Instruction Set Computer processor. In an example embodiment, the processor module 560 may include one or more processor cores embedded in a processor. In further example embodiments, the processor module 560 may include one or more embedded processors, or embedded processing elements in a Field Programmable Gate Array, an ASIC, or Digital Signal Processor. In an example embodiment, the network module 530 may include a network interface, such as Ethernet, optical network interface, a wireless network interface, T1/T3 interface, a WAN or LAN interface. In a further example embodiment, the network module 530 may include a network processor. In an example embodiment, the computer storage module 540 may include Random Access Memory (RAM), Dynamic Random Access Memory, Static Random Access Memory, Synchronous Dynamic Random Access Memory, or memory utilized by the processor module 560 or the network module 530. In an example embodiment, the storage module 540 may store data utilized by the processor module 560. In an example embodiment, the storage module 540 may include a hard disk drive, a solid state drive, an external disk, a digital versatile disc, a compact disk, or a readable external disk. The storage module 540 may store one or more computer programming instructions which when executed by the processor module 560 or network module 530 can implement one or more of the functionality of the methods and systems for caching network generated security certificates described herein. In an example embodiment, the network node 510 may include an input/output (I/O) module 570, which may include a keyboard, a keypad, a mouse, a gesture based input sensor, a microphone, a physical or sensory input peripheral, a display, a speaker, or a physical or sensual output peripheral.

Referring again to FIG. 2, the client device 101 may be a network node as illustrated in FIG. 5 and may be connected to data network 500. The client device 101 can include a personal computer, a laptop computer, a tablet, a smartphone, a mobile phone, an Internet phone, a netbook, a home gateway, a broadband gateway, a network appliance, a set top box, a media server, a personal media play, an access gateway, a networking switch, a server computer, a network storage computer, or any computing device comprising at least a network module and a processor module.

In an example embodiment, the server device 201 may include a server network computer connected to the data network 500. The server device 201 may serve the secure session 130 requested indirectly by the client device 101 via the secure gateway 303.

In an example embodiment, the secure session 130 may include a service session, such as a HyperText Transfer Protocol session, a file transfer session, a remote access session, a File Transfer Protocol session, a voice over IP session, a Session Initiation Protocol session, a video or audio streaming session, a e-commerce session, an enterprise application session, an email session, an online gaming session, a teleconference session, or a Web-based communication session. In another example embodiment, the secure session 130 may include a service session with security such as an SSL session, a transport layer security (TLS) session, an IP Security (IPSec) session, a secure TCP session, a secure Web session, a secure VPN session, a secure voice over IP session, a secure video or audio streaming session, a secure conferencing session, a secure document access session, a secure network access session, a secure e-commerce session, a secure business-to-business transaction session, a secure financial transaction session, a secure collaboration session, or a secure on-line game session. In an example embodiment, the session request 131 may include a request message for a SSL session, a TLS session, an IPSec session, a secure TCP session, or a request message specified in a secure session protocol used by the client device 101.

In an example embodiment, the security gateway 303 may be a network node and may include one or more of functionality of a firewall, an SSL proxy gateway, a server load balancer, an application delivery controller, a threat protection system, a secure traffic manager, a legal interception gateway, a VPN gateway, or a TCP proxy gateway. In further example embodiments, the security gateway 303 may include one or more hardware security modules such as a hardware-based crypto module or a hardware-based encryption engine. In another example embodiment, the security gateway 303 may include a security system including one or more network nodes and a data network, where one network node processes the secure session 130 with the client device 101 and one network node processes the secure session 220 with the server device 201. In an example embodiment, the security gateway 303 may include a security application to process decrypted intercepted secure session data traffic. The security application may include virus detection, credit card fraud, document or identity theft, session recording, cyber-attack detection, company security policy processing, or government security policy or compliant processing.

In an example embodiment, the server certificate 351 may be a security certificate, selected from an Internet security certificate, an SSL certificate, a Certification Authority (CA) certificate, a corporate issued security certificate, a network generated security certificate, a trusted security certificate, a user certificate, or any digital security certificate used between peers of a secure data communication session. In an example embodiment, the server certificate 351 may include a digital signature, a key for encryption and decryption, a cipher method, an identity, and so forth.

Figure 6:
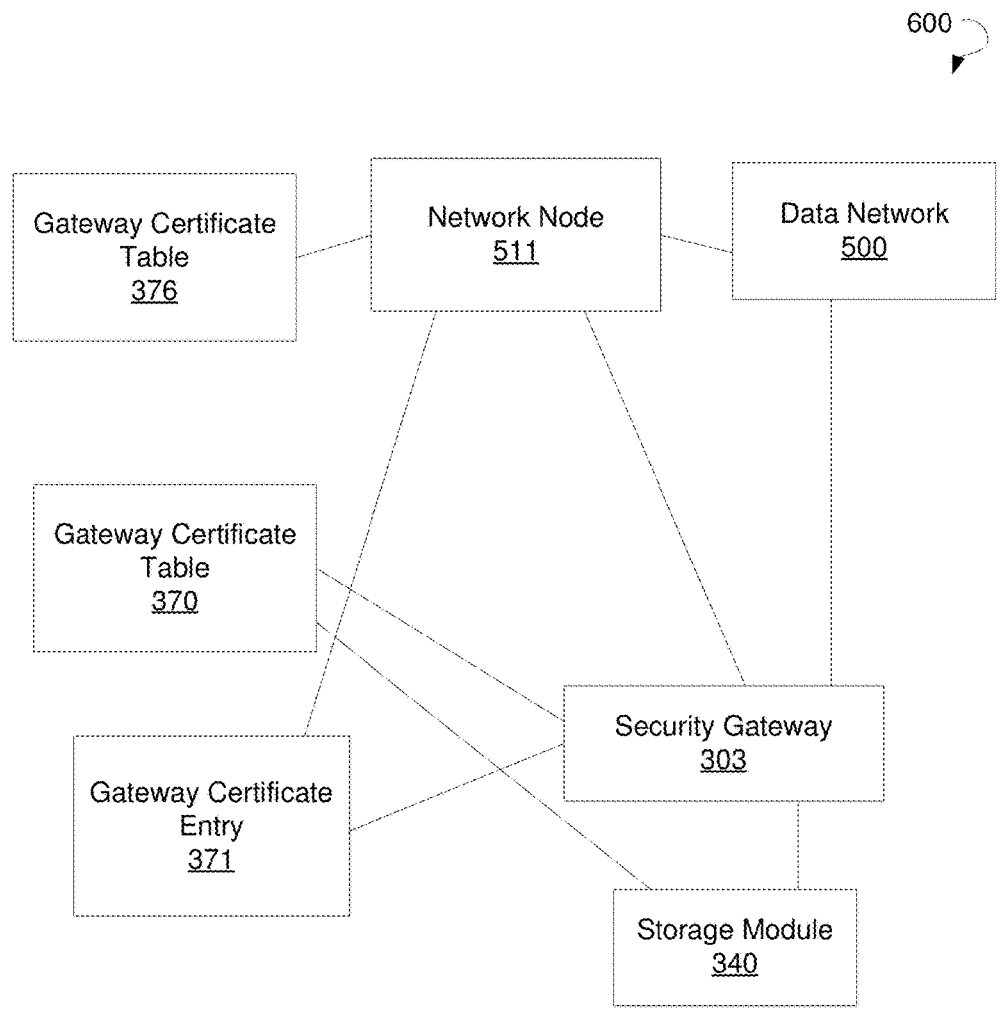
FIG. 6 is a block diagram illustrating a method for managing a plurality of cached network generated security certificates.

FIG. 6 is a block diagram 600 illustrating an exemplary embodiment of managing a plurality of cached network generated security certificates, according to an example embodiment. The security gateway 303 may be connected to a network node 511 over a data network, such as data network 500. The network node 511 may include a network storage device, a network management system, or another security gateway. In some embodiments, a monitoring device (not shown) may connected to the security gateway 303 and the network node 511. The monitoring device may be responsible for monitoring data passing between the security gateway 303 and the network node 511.

In an example embodiment, the security gateway 303 may include a gateway certificate table 370 containing a plurality of previously generated gateway certificate entries or previously cached gateway certificate entries. The security gateway 303 may store the gateway certificate table 370 in a storage module 340 of the security gateway 303. In further embodiments, the gateway certificate table 370 from the storage module 340 may be additionally stored in an external storage (not shown).

In an example embodiment, the security gateway 303 may send the gateway certificate table 370 to the network node 511 so that the network node 511 can store the received gateway certificate table 370. In an example embodiment, the security gateway 303 may generate or modify a gateway certificate entry 371 and store the generated or modified gateway certificate entry 371 into the gateway certificate table 370, or remove the gateway certificate entry 371 from the gateway certificate table 370. The security gateway 303 may further store the updated gateway certificate table 370 in the storage module 340. The security gateway 303 may also send the gateway certificate entry 371 to the network node 511 with an indication that the gateway certificate table 370 was modified, generated, or removed.

In an example embodiment, the network node 511 may include a gateway certificate table 376. The network node 511 may send the gateway certificate table 376 to the security gateway 303. In an example embodiment, the security gateway 303 may include the gateway certificate table 370. The security gateway 303 may combine the received gateway certificate table 376 into the gateway certificate table 370. In an example embodiment, the network node 511 may send the gateway certificate entry 371 to the security gateway 303, so that the security gateway 303 may combine the gateway certificate entry 371 into the gateway certificate table 370. In an example embodiment, the security gateway 303 may store the updated gateway certificate table 370 into the storage module 340. In an example embodiment, the security gateway 303 may detect one or more duplicate gateway certificate entries during the combining process and remove duplicate entries from the combined gateway certificate table 370.

Figure 7:
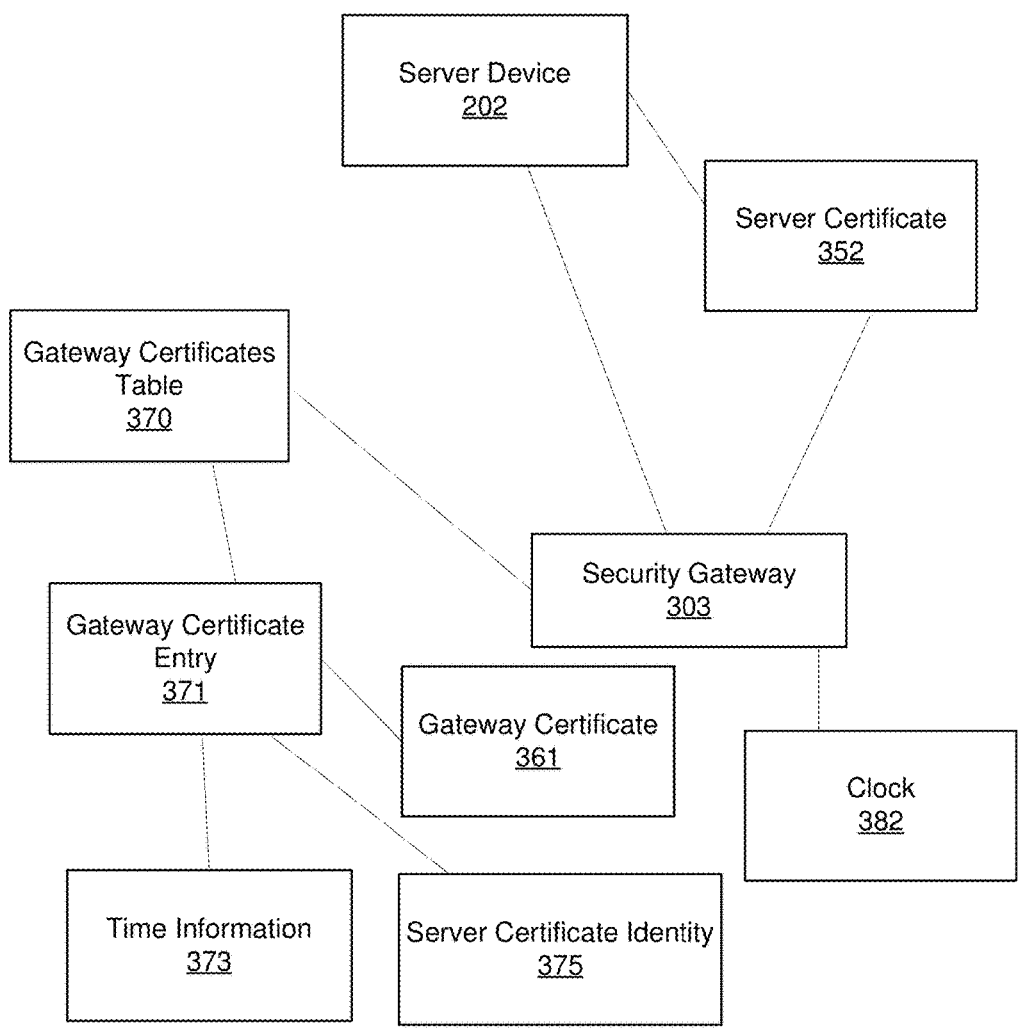
FIG. 7 is a block diagram illustrating a method for updating a plurality of cached network generated security certificates.

FIG. 7 is a block diagram 700 illustrating an exemplary embodiment of updating a plurality of cached network generated security certificates, according to an example embodiment. A security gateway 303 may include a gateway certificate table 370 and may be coupled to a clock 382. From time to time, the security gateway 303 may check, based on the clock 382, if a gateway certificate entry 371 of the gateway certificate table 370 is valid. In an example embodiment, the security gateway 303 may use one or more timers associated with the clock 372 and may examine the gateway certificate table 370 when a timer expires. A user or a network administrator may configure the one or more timers. In an example embodiment, the security gateway 303 may examine the gateway certificate table 370 at predetermined time periods, for example, every hour, every morning at 8 am, every night at 12 am, every other day at 12 am, every 30 minutes, and so forth.

In an example embodiment, the security gateway 303 may examine if an entry, such as the gateway certificate entry 371, is valid. More specifically, the security gateway 303 may obtain time information 373 of the gateway certificate entry 371 and match the time information 373 against a current time of the clock 382. If the time information 373 indicates that gateway certificate entry 371 is valid, the gateway 303 may determine that gateway certificate entry 371 is valid. In an example embodiment, the security gateway 303 may determine that the time information 373 is not valid or is expired, according to current time of the clock 382. Therefore, the security gateway 303 may determine that gateway certificate entry 371 is not valid. In an example embodiment, the security gateway 303 may update the gateway certificate entry 371 or remove the gateway certificate entry 371 from the gateway certificate table 370.

In an example embodiment, the security gateway 303 may obtain a server certificate identity 375 from the gateway certificate entry 371. The security gateway 303 may use the server certificate identity 375 to identity a server device 202 and query the server device 202 for an updated server certificate 352 corresponding to the gateway certificate entry 371. In an example embodiment, the security gateway 303 may generate a new gateway certificate based on the updated server certificate 352 and replace the gateway certificate 361 of the gateway certificate entry 371 with the newly generated gateway certificate. In an example embodiment, the security gateway 303 may update the time information 373 with a time information obtained from the updated server certificate 352, or replace the time information 373 with a pre-determined time information. Subsequently, the security gateway 303 may store the updated gateway certificate entry 371 into the gateway certificate table 370.

Figure 8:
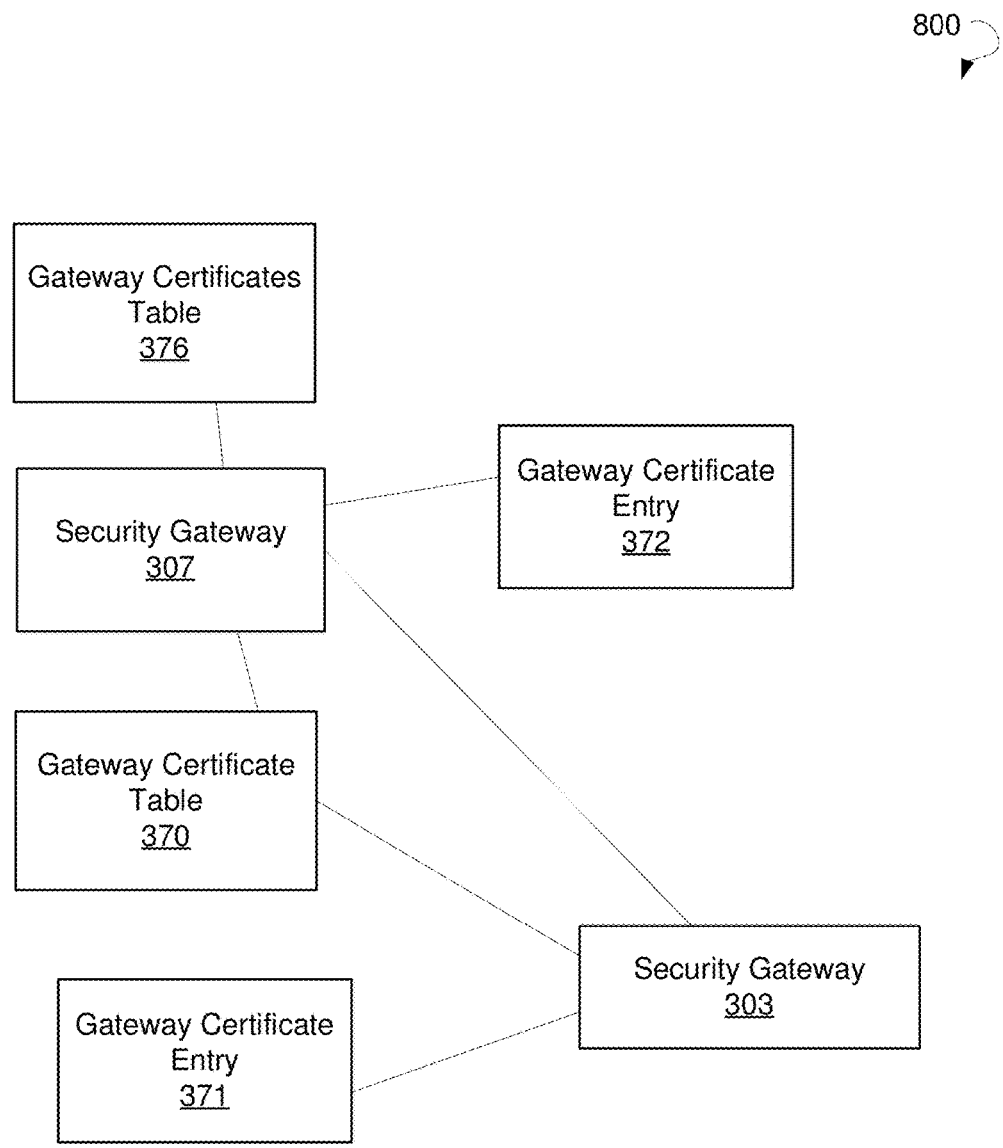
FIG. 8 is a block diagram illustrating a method for sharing a plurality of cached network generated security certificates between a plurality of security gateways.

FIG. 8 is a block diagram 800 illustrating sharing a plurality of network generated security certificates among a plurality of security gateways, according to an example embodiment. In this embodiment, the security gateway 303 may share a gateway certificate table 370 with at least another security gateway 307. In an example embodiment, the security gateway 303 may store the gateway certificate table 370 in a storage module of the security gateway 303. The security gateway 303 may send any update of the gateway certificate table 370 to the security gateway 307 or receive any update of the gateway certificate table 370 from the security gateway 307. In an example embodiment, the security gateway 303 may generate a new gateway certificate entry 371, or modify a current gateway certificate entry 371, and store the generated or modified gateway certificate entry 371 into the gateway certificate table 370. The security gateway 303 may send modified gateway certificate table 370, generated or modified gateway certificate entry 371 to the security gateway 307.

In an example embodiment, the security gateway 303 may receive a generated gateway certificate entry 372 or a modified gateway certificate entry 372 from the security gateway 307. The security gateway 303 may store the generated gateway certificate entry 372 into the gateway certificate table 370, or find a matching gateway certificate entry 371 to the modified gateway certificate entry 372 and replace the gateway certificate entry 371 with the gateway certificate entry 372. In an example embodiment, the security gateway 303 may receive the gateway certificate table 376 the from security gateway 307. The security gateway 303 may replace the gateway certificate table 370 with the received gateway certificate table 376, or combine the received gateway certificate table 376 with the gateway certificate table 370.

In an example embodiment, the gateway certificate table 370 may be a shared gateway certificate table. The security gateway 303 and the security gateway 307 may use the shared gateway certificate table to serve client devices and server devices. In an example embodiment, the security gateway 303 and the security gateway 307 may provide fault redundancy or fault resiliency to security services using the shared gateway certificate table.

Figure 9:
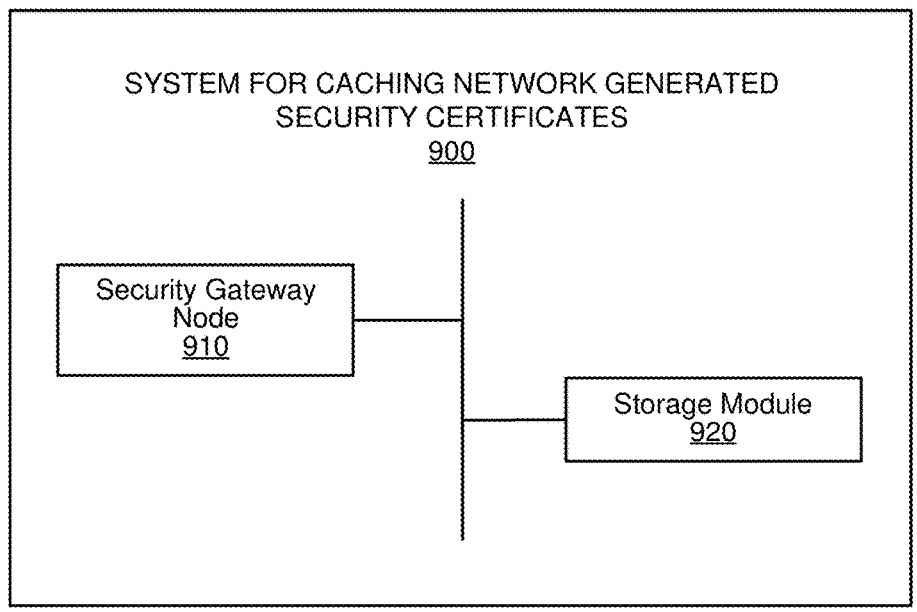
FIG. 9 is a block diagram of a system for caching network generated security certificates.

FIG. 9 is a block diagram representing components of a system 900 for caching network generated security certificates, in accordance with certain embodiments. The system 900 can comprise a security gateway node 910 and a storage module 920. The operations performed by the security gateway node 910 and the storage module 920 are described in detail with reference to FIG. 10.

Figure 10:
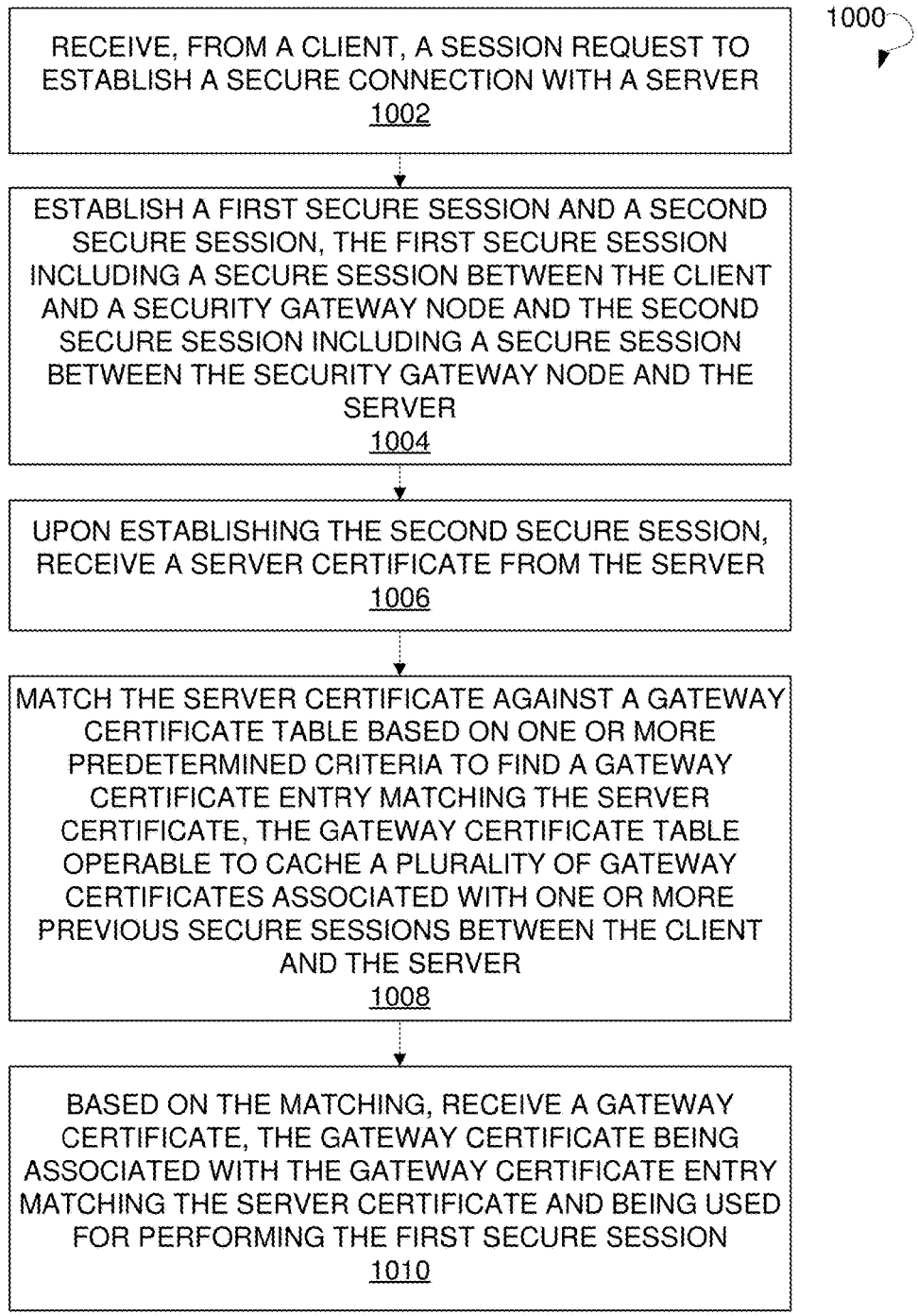
FIG. 10 is a process flow diagram showing a method for caching network generated security certificates.

FIG. 10 is a flow diagram showing operations of a method 1000 for caching network generated security certificates, according to an example embodiment. In some embodiments, the steps may be combined, performed in parallel, or performed in a different order. The method 1000 may also include additional or fewer steps than those illustrated.

The method 1000 can commence with receiving, by a security gateway node, a session request from a client to establish a secure connection with a server at operation 702. At operation 1004, the security gateway node can establish, based on the session request, a first secure session and a second secure session. The first secure session may include a secure session between the client and the security gateway node. The second secure session may include a secure session between the security gateway node and the server. Upon establishing the second secure session, the security gateway node may receive a server certificate from the server at operation 1006. At operation 1008, the security gateway node may match the server certificate against a gateway certificate table based on one or more predetermined criteria to find a gateway certificate entry matching the server certificate. Additionally, in an example embodiment, an SNI and a client identity associated with the session request may be matched against the gateway certificate table to find gateway certificate entries that match the SNI and the client identity.

The gateway certificate table may be operable to cache a plurality of gateway certificates associated with one or more previous secure sessions between the client and the server. The plurality of gateway certificates may be stored in a plurality of gateway certificate entries of the gateway certificate table. At operation 1010, based on the matching, the security gateway node may receive a gateway certificate associated with the gateway certificate entry that matches the server certificate. The gateway certificate may be used by the security gateway node for performing the first secure session.

In an example embodiment, the method 1000 may further include determining, based on the matching, that no gateway certificate entry matching the server certificate exists. Upon such determination, a further gateway certificate may be generated based on the server certificate. In certain example embodiments, the generation of the further gateway certificate may be based on the SNI. Upon the generation, the further gateway certificate may be stored to the gateway certificate table.

Additionally, an expiration time may be set for the generated further gateway certificate and stored to the gateway certificate table. The expiration time may be set based on expiration time of the server certificate, pre-configured expiration time (e.g., based on the SNI), and so forth.

Additionally, upon receipt of the gateway certificate from the gateway certificate table, the security gateway node may validate the gateway certificate. In an example embodiment, validation may be based at least on time information associated with the gateway certificate.

In a further example embodiment, based on the validating, the security gateway node may determine that the gateway certificate is invalid. Based on such determination, the security gateway node may generate a further gateway certificate associated with the server certificate. More specifically, the further gateway certificate may be generated based on the server certificate. Upon generation, the further gateway certificate may be stored to the gateway certificate table. Additionally, the gateway certificate determined to be invalid may be removed from the gateway certificate table.

In an example embodiment, upon receipt of the gateway certificate, the gateway certificate may be forged to obtain a forged gateway certificate. The forged gateway certificate may be used to perform the first secure session.

In an example embodiment, based on the matching, a partial match of the server certificate and the gateway certificate entry may be determined. Upon determination of the partial match, the gateway certificate entry may be modified based on the server certificate to obtain a modified gateway certificate associated with the server certificate. The modified gateway certificate may be stored to the gateway certificate entry of the gateway certificate table.

In some example embodiments, the method 1000 may optionally include exchanging, by the security gateway node, one or more gateway certificates with a further security gateway node. The exchanging may include sending one or more of the plurality of gateway certificates by the security gateway node to the further security gateway node and receiving a further plurality of gateway certificates from the further security gateway node by the security gateway node.

The method 1000 may further include continuously monitoring the gateway certificate table based on a current time and time information associated with the plurality of gateway certificates stored in the gateway certificate table. Based on the monitoring, one of the plurality of gateway certificates may be determined to be expired. Based on the determination that one of the plurality of gateway certificates has expired, the server may be queried by the security gateway node to receive an updated server certificate. Upon receipt of the updated server certificate, a further gateway certificate may be generated by the security gateway node based on the one of the plurality of gateway certificates. The one of the plurality of gateway certificates may be replaced with the further gateway certificates in one of gateway certificate entries of the gateway certificate table.

Figure 11:
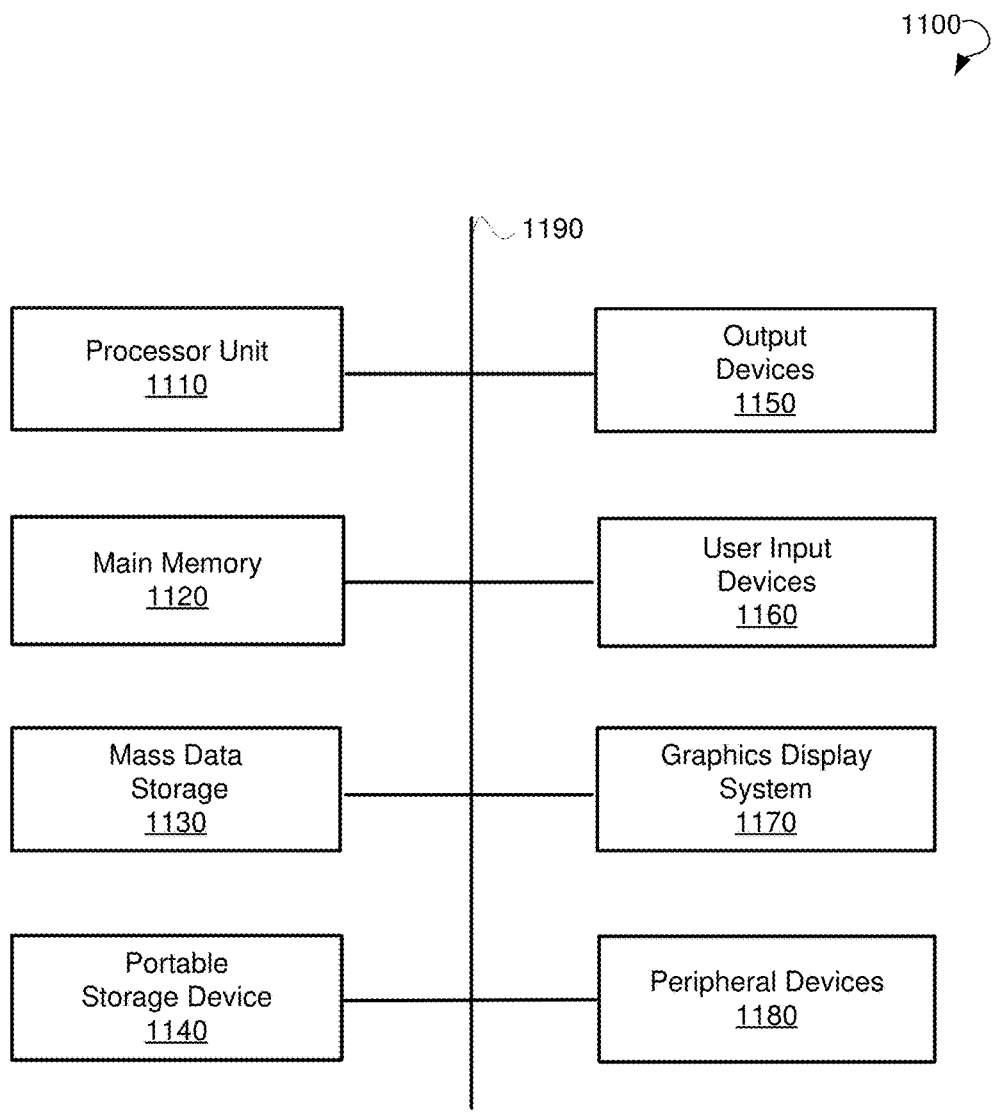
FIG. 11 shows a diagrammatic representation of a computing device for a machine, within which a set of instructions for causing the machine to perform any one or more of the methodologies discussed herein, can be executed.

FIG. 11 illustrates an example computer system 1100 that may be used to implement embodiments of the present disclosure. The system 1100 of FIG. 11 can be implemented in the contexts of the likes of computing systems, networks, servers, or combinations thereof. The computing system 1100 of FIG. 11 may include one or more processor units 810 and main memory 1120. Main memory 1120 stores, in part, instructions and data for execution by processor 1110. Main memory 1120 stores the executable code when in operation. The computer system 1100 of FIG. 11 may further include a mass data storage 1130, portable storage medium drive(s) 1140, output devices 1150, user input devices 1160, a graphics display system 1170, and peripheral devices 1180. The methods may be implemented in software that is cloud-based.

The components shown in FIG. 11 are depicted as being connected via a single bus 11110. The components may be connected through one or more data transport means. Processor unit 1110 and main memory 1120 is connected via a local microprocessor bus, and the mass data storage 1130, peripheral device(s) 1180, portable storage device 1140, and graphics display system 1170 are connected via one or more I/O buses.

Mass data storage 1130, which can be implemented with a magnetic disk drive, solid state drive, or an optical disk drive, is a non-volatile storage device for storing data and instructions for use by processor unit 1110. Mass data storage 1130 stores the system software for implementing embodiments of the present disclosure for purposes of loading that software into main memory 1120.

Portable storage device 1140 operates in conjunction with a portable non-volatile storage medium, such as a floppy disk, compact disk, digital video disc (DVD), or USB storage device, to input and output data and code to and from the computer system 1100 of FIG. 11. The system software for implementing embodiments of the present disclosure is stored on such a portable medium and input to the computer system 1100 via the portable storage device 1140.

User input devices 1160 provide a portion of a user interface. User input devices 1160 include one or more microphones, an alphanumeric keypad, such as a keyboard, for inputting alphanumeric and other information, or a pointing device, such as a mouse, a trackball, stylus, or cursor direction keys. User input devices 1160 can also include a touchscreen. Additionally, the computer system 1100 as shown in FIG. 11 includes output devices 1150. Suitable output devices include speakers, printers, network interfaces, and monitors.

Graphics display system 1170 includes a liquid crystal display or other suitable display device. Graphics display system 1170 receives textual and graphical information and processes the information for output to the display device.

Peripheral devices 1180 may include any type of computer support device to add additional functionality to the computer system.

The components provided in the computer system 1100 of FIG. 11 are those typically found in computer systems that may be suitable for use with embodiments of the present disclosure and are intended to represent a broad category of such computer components that are well known in the art. Thus, the computer system 1100 of FIG. 11 can be a personal computer, hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, BLU-RAY disc, any other optical storage medium, RAM, Programmable Read-Only Memory, Erasable Programmable Read-Only Memory, Electronically Erasable Programmable Read Only Memory, flash memory, and/or any other memory chip, module, or cartridge.

In some embodiments, the computer system 1100 may be implemented as a cloud-based computing environment, such as a virtual machine operating within a computing cloud. In other embodiments, the computer system 1100 may itself include a cloud-based computing environment, where the functionalities of the computer system 1100 are executed in a distributed fashion. Thus, the computer system 1100, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for caching network generated security certificates are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for caching network generated security certificates, the system comprising:
   a security gateway node operable to:
   receive, from a client, a session request to establish a secure connection with a server;
   based on the session request, establish a first secure session and a second secure session, the first secure session including a secure session between the client and the security gateway node and the second secure session including a secure session between the security gateway node and the server;
   upon establishing the second secure session, receive a server certificate from the server;
   match the server certificate against a gateway certificate table based on one or more predetermined criteria to find a gateway certificate entry matching the server certificate, the gateway certificate table operable to cache a plurality of gateway certificates associated with one or more previous secure sessions between the client and the server;
   based on the matching, receive a gateway certificate, the gateway certificate being associated with the gateway certificate entry matching the server certificate and being used for performing the first secure session; and
   upon receiving the gateway certificate, forge the gateway certificate to obtain a forged gateway certificate, wherein the first secure session is performed using the forged gateway certificate; and a storage module operable to store at least the gateway certificate table.

2. The system of claim 1, wherein the security gateway node is further operable to:
based on the matching, determine that no gateway certificate entry matching the server certificate exists;
upon the determination, generate a further gateway certificate based on the server certificate; and
store the further gateway certificate to the gateway certificate table.

3. The system of claim 1, wherein the security gateway node is further operable to, upon the receiving of the gateway certificate, validate the gateway certificate, wherein the validating is based at least on time information associated with the gateway certificate.

4. The system of claim 3, wherein the security gateway node is further operable to:
based on the validating, determine that the gateway certificate is invalid;
based on the determining, generate a further gateway certificate, the further gateway certificate being associated with the server certificate; and
store the further gateway certificate to the gateway certificate table.

5. The system of claim 1, wherein the security gateway node is further operable to:
based on the matching, determine a partial match of the server certificate and the gateway certificate entry;
upon the determining, modify the gateway certificate entry based on the server certificate to obtain a modified gateway certificate, the modified gateway certificate being associated with the server certificate; and
store the modified gateway certificate to the gateway certificate table.

6. The system of claim 1, wherein the security gateway node is further operable to:
exchange one or more gateway certificates with a further security gateway node, wherein the exchanging includes sending by the security gateway node one or more of the plurality of gateway certificates to the further security gateway node and receiving, by the security gateway node, a further plurality of gateway certificates from the further security gateway node.

7. The system of claim 1, wherein the security gateway node is further operable to:
continuously monitor the gateway certificate table based on a current time and time information associated with the plurality of gateway certificates stored in the gateway certificate table; and
determine that one of the plurality of gateway certificates has expired.

8. The system of claim 7, wherein the security gateway node is further operable to:
based on the determining that one of the plurality of gateway certificates has expired, query the server to receive an updated server certificate;
upon receipt of the updated server certificate, generate a further gateway certificate based on the one of the plurality of gateway certificates; and
replace the one of the plurality of gateway certificates with the further gateway certificate in one of gateway certificate entries of the gateway certificate table.

9. A method for caching network generated security certificates, the method comprising:

receiving, by a security gateway node, from a client, a session request to establish a secure connection with a server;
based on the session request, establishing, by the security gateway node, a first secure session and a second secure session, the first secure session including a secure session between the client and the security gateway node and the second secure session including a secure session between the security gateway node and the server;
upon establishing the second secure session, receiving, by the security gateway node, a server certificate from the server;
matching, by the security gateway node, the server certificate against a gateway certificate table based on one or more predetermined criteria to find a gateway certificate entry matching the server certificate, the gateway certificate table operable to cache a plurality of gateway certificates associated with one or more previous secure sessions between the client and the server;
based on the matching, receiving, by the security gateway node, a gateway certificate, the gateway certificate being associated with the gateway certificate entry matching the server certificate and being used for performing the first secure session; and
upon receiving the gateway certificate, forging the gateway certificate to obtain a forged gateway certificate, wherein the first secure session is performed using the forged gateway certificate.

10. The method of claim 9, further comprising:
based on the matching, determining that no gateway certificate entry matching the server certificate exists;
upon the determination, generating a further gateway certificate based on the server certificate; and
storing the further gateway certificate to the gateway certificate table.

11. The method of claim 9, further comprising, upon the receiving of the gateway certificate, validating, by the security gateway node, the gateway certificate, wherein the validating is based at least on time information associated with the gateway certificate.

12. The method of claim 11, further comprising:
based on the validating, determining, by the security gateway node, that the gateway certificate is invalid;
based on the determining, generating, by the security gateway node, a further gateway certificate, the further gateway certificate being associated with the server certificate; and
storing the further gateway certificate to the gateway certificate table.

13. The method of claim 12, further comprising removing the gateway certificate from the gateway certificate table.

14. The method of claim 9, further comprising:
based on the matching, determining a partial match of the server certificate and the gateway certificate entry;
upon the determining, modifying the gateway certificate entry based on the server certificate to obtain a modified gateway certificate, the modified gateway certificate being associated with the server certificate; and
storing the modified gateway certificate to the gateway certificate table.

15. The method of claim 9, further comprising:
exchanging, by the security gateway node, one or more gateway certificates with a further security gateway node, wherein the exchanging includes sending by the security gateway node one or more of the plurality of gateway certificates to the further security gateway node and receiving, by the security gateway node, a further plurality of gateway certificates from the further security gateway node.

16. The method of claim 9, further comprising:

continuously monitoring the gateway certificate table based on a current time and time information associated with the plurality of gateway certificates stored in the gateway certificate table; and determining that one of the plurality of gateway certificates has expired.

17. The method of claim 16, further comprising:

based on the determining that one of the plurality of gateway certificates has expired, querying the server to receive an updated server certificate;

upon receipt of the updated server certificate, generating a further gateway certificate based on the one of the plurality of gateway certificates; and replacing the one of the plurality of gateway certificates with the further gateway certificate in one of gateway certificate entries of the gateway certificate table.

18. A system for caching network generated security certificates, the system comprising:

a security gateway node operable to:

receive, from a client, a session request to establish a secure connection with a server;

based on the session request, establish a first secure session and a second secure session, the first secure session including a secure session between the client and the security gateway node and the second secure session including a secure session between the security gateway node and the server;

upon establishing the second secure session, receive a server certificate from the server;

match the server certificate against a gateway certificate table based on one or more predetermined criteria to find a gateway certificate entry matching the server certificate, the gateway certificate table operable to cache a plurality of gateway certificates associated with one or more previous secure sessions between the client and the server;

based on the matching, receive a gateway certificate, the gateway certificate being associated with the gateway certificate entry matching the server certificate and being used for performing the first secure session;

upon the receiving of the gateway certificate, validate the gateway certificate, wherein the validating is based at least on time information associated with the gateway certificate and forge the gateway certificate to obtain a forged gateway certificate, wherein the first secure session is performed using the forged gateway certificate;

based on the matching, determine that no gateway certificate entry matching the server certificate exists;

upon the determining, generate a further gateway certificate based on the server certificate; and store the further gateway certificate to the gateway certificate table; and a storage module operable to store at least the gateway certificate table.

* * * * *